United States Patent
Hong et al.

(10) Patent No.: US 11,505,096 B2
(45) Date of Patent: Nov. 22, 2022

(54) RECLINING DEVICE FOR SEAT

(71) Applicants: HYUNDAI MOTOR COMPANY, Seoul (KR); KIA CORPORATION, Seoul (KR); DAECHANG SEAT CO., LTD-DONGTAN, Hwaseong-si (KR)

(72) Inventors: Suk Won Hong, Bucheon-si (KR); Jong Seok Han, Suwon-si (KR); Jun Yong Kim, Seoul (KR); Sang Do Park, Suwon-si (KR); Sang Man Seo, Suwon-si (KR); Sung Hak Hong, Suwon-si (KR); Myung Soo Lee, Osan-si (KR); In Chang Hwang, Ulsan (KR); Kyoung Min Cho, Hwaseong-si (KR)

(73) Assignees: HYUNDAI MOTOR COMPANY, Seoul (KR); KIA CORPORATION, Seoul (KR); DAECHANG SEAT CO., LTD-DONGTAN, Hwaseong-si (KR)

(*) Notice: Subject to any disclaimer, the term of this patent is extended or adjusted under 35 U.S.C. 154(b) by 0 days.

(21) Appl. No.: 17/333,501

(22) Filed: May 28, 2021

(65) Prior Publication Data
US 2022/0111772 A1    Apr. 14, 2022

(30) Foreign Application Priority Data
Oct. 14, 2020    (KR) .................. 10-2020-0132641

(51) Int. Cl.
*B60N 2/22*    (2006.01)
(52) U.S. Cl.
CPC ................... *B60N 2/2245* (2013.01)

(58) Field of Classification Search
CPC ........ B60N 2/2245; B60N 2/22; A47C 1/0242
USPC ...................................................... 297/362.11
See application file for complete search history.

(56) References Cited

U.S. PATENT DOCUMENTS

| 7,819,478 B2 * | 10/2010 | Griswold | ............. | B60N 2/2245 |
| | | | | 297/378.12 |
| 2008/0129017 A1 * | 6/2008 | Okazaki | ................ | B60N 2/366 |
| | | | | 280/727 |
| 2011/0175420 A1 * | 7/2011 | Bruck | .................. | B60N 2/2245 |
| | | | | 297/363 |
| 2011/0187171 A1 * | 8/2011 | Ishii | ........................ | B60N 2/22 |
| | | | | 296/65.17 |
| 2011/0233981 A1 * | 9/2011 | Ishii | ..................... | B60N 2/2245 |
| | | | | 297/365 |

(Continued)

FOREIGN PATENT DOCUMENTS

| JP | 2010-274690 A | 12/2010 |
| JP | 5402536 B2 | 1/2014 |
| KR | 2004-0033909 A | 4/2004 |

*Primary Examiner* — Mark R Wendell
(74) *Attorney, Agent, or Firm* — McDonnell Boehnen Hulbert & Berghoff LLP

(57) ABSTRACT

The present disclosure relates to a reclining device for a seat, which can adjust a seatback at various angles through movement of a striker installed in a vehicle body. The reclining device for a seat includes a latch installed on a side of a seatback and configured to be rotated together with the seatback, and a striker module in which the latch is engaged with a striker installed in a vehicle body, where the striker moves in a certain section overlapping a rotation trajectory of the latch in a state where the latch is engaged and reclines the seatback together with the latch.

8 Claims, 10 Drawing Sheets

(56) References Cited

U.S. PATENT DOCUMENTS

2015/0336478 A1* 11/2015 Mitsuhashi .............. B60N 2/20
                                                    296/65.09
2018/0111514 A1*  4/2018 Ruan ....................... B60N 2/06

* cited by examiner

RECLINING DEVICE FOR SEAT

CROSS REFERENCE TO RELATED APPLICATIONS

The present application claims priority of Korean Patent Application No. 10-2020-0132641 filed on Oct. 14, 2020, the entire contents of which is incorporated herein for all purposes by this reference.

BACKGROUND

Field

The present disclosure provides a reclining device for a seat, which can adjust a seatback at various angles through movement of a striker installed in a vehicle body.

Description of the Related Art

A reclining device is a device which functions to adjust a seatback angle by lifting a manual lever, and a mechanism called a recliner core is provided at a lower end thereof and a part, such as a leg bracket, is mounted thereon to support the recliner core.

Such a reclining device has an advantage that it can adjust the angle of the seatback at various angles at intervals of 2°, and thus has been applied to many vehicle models.

However, since all structures are supported by two recliner cores, the reclining device has a weak strength as compared with other seatback adjustment mechanisms, and since many parts are used, the cost and weight of a product are increased.

In order to solve such problems, a 3-point fixing type multistage latch structure has been proposed, in which a vehicle body and a seat are fixed in two places of a bottom hinge and in one place of a top striker.

In this case, the seat and the vehicle body are fixed in several places, and thus the multistage latch structure has an advantage in that it is excellent from the viewpoint of the strength as compared with the reclining device.

However, in case of the multistage latch structure, since the seatback angle is adjusted by making a plurality of mounting grooves on one latch, it is unable to variously adjust a rotation angle of the seatback.

Further, since the multistage latch also adjusts the seatback angle by directly lifting a lever manually as in the existing reclining device, it is uncomfortable to adjust the seatback angle.

The foregoing description of the background technology is intended merely to help the understanding of the background of the present disclosure, and is not intended to mean that the present disclosure falls within the purview of the related art that is already known to those of ordinary skill in the art.

SUMMARY

The present disclosure is proposed to solve the above-mentioned problems, and provides a reclining device for a seat, which can adjust a seatback at various angles through movement of a striker installed in a vehicle body for combination with a latch.

In order to achieve the above object, a reclining device for a seat according to the present disclosure may include a latch installed on a side of a seatback and configured to be rotated together with the seatback, and a striker module in which the latch is engaged with a striker installed in a vehicle body, and the striker moves in a certain section overlapping a rotation trajectory of the latch in a state where the latch is engaged and reclines the seatback together with the latch.

The striker module may include a lead screw installed on the vehicle body along a linear trajectory on which the striker moves, a moving block penetratingly combined with the lead screw in a screw structure and configured to move in a straight line along the lead screw in a state where a rotation motion of the lead screw is converted into a linear motion, and the striker configured to move together with the moving block.

The reclining device may include a guide bracket combined between the moving block and the striker; and a guide wire combined with the vehicle body, penetratingly provided in the guide bracket in a direction parallel to the lead screw, and configured to guide the straight movement of the moving block.

An extension part may be formed at both ends of the guide bracket in a direction orthogonal to the lead screw, and a guide hole may be formed on the extension part and the guide wire may be penetratingly provided in the guide hole.

The reclining device may further include a motor configured to provide a rotational driving force to the lead screw.

A reclining switch may be provided in a vehicle compartment, and the motor may be rotated in a forward or reverse direction in accordance with an operation of the reclining switch.

A module mounting bracket may be combined with the vehicle body, a support part may be formed to be bent at both ends of the module mounting bracket toward the striker, a sub bracket may be combined with the support part, a main support hole and a sub support hole may be coaxially formed on the support part and the sub bracket, respectively, the main support hole and the sub support hole being formed to be spaced apart from each other, and the lead screw may be inserted into and supported by the main support hole and the sub support hole.

A motor mounting bracket may be combined with the vehicle body and the motor may be mounted thereon, an end part of the motor mounting bracket and an end part of the module mounting bracket may be provided to overlap each other, and border portions and overlapping portions of the motor mounting bracket and the module mounting bracket may be bolting-combined with the vehicle body.

A hook portion in which the striker is combined with the latch may be formed, the hook portion may be formed in a shape of an elongated hole along a normal direction with respect to the rotation trajectory of the latch, and a maximum angle range of the seatback may be determined by configuring an offset range in which the striker is movable along the hook portion in a state where the movement trajectory of the striker and the rotation trajectory of the latch are simultaneously satisfied.

The maximum angle range of the seatback may be 10° to 50°.

Through the above-described problem solving means, according to the present disclosure, since the striker moves in accordance with the operation of the motor and the latch is pulled to move in the movement direction of the striker, the seatback combined with the latch moves together, and thus it is possible to recline the seatback at stepless angles.

BRIEF DESCRIPTION OF THE FIGURES

The above and other objects, features and advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings.

Figure 1:
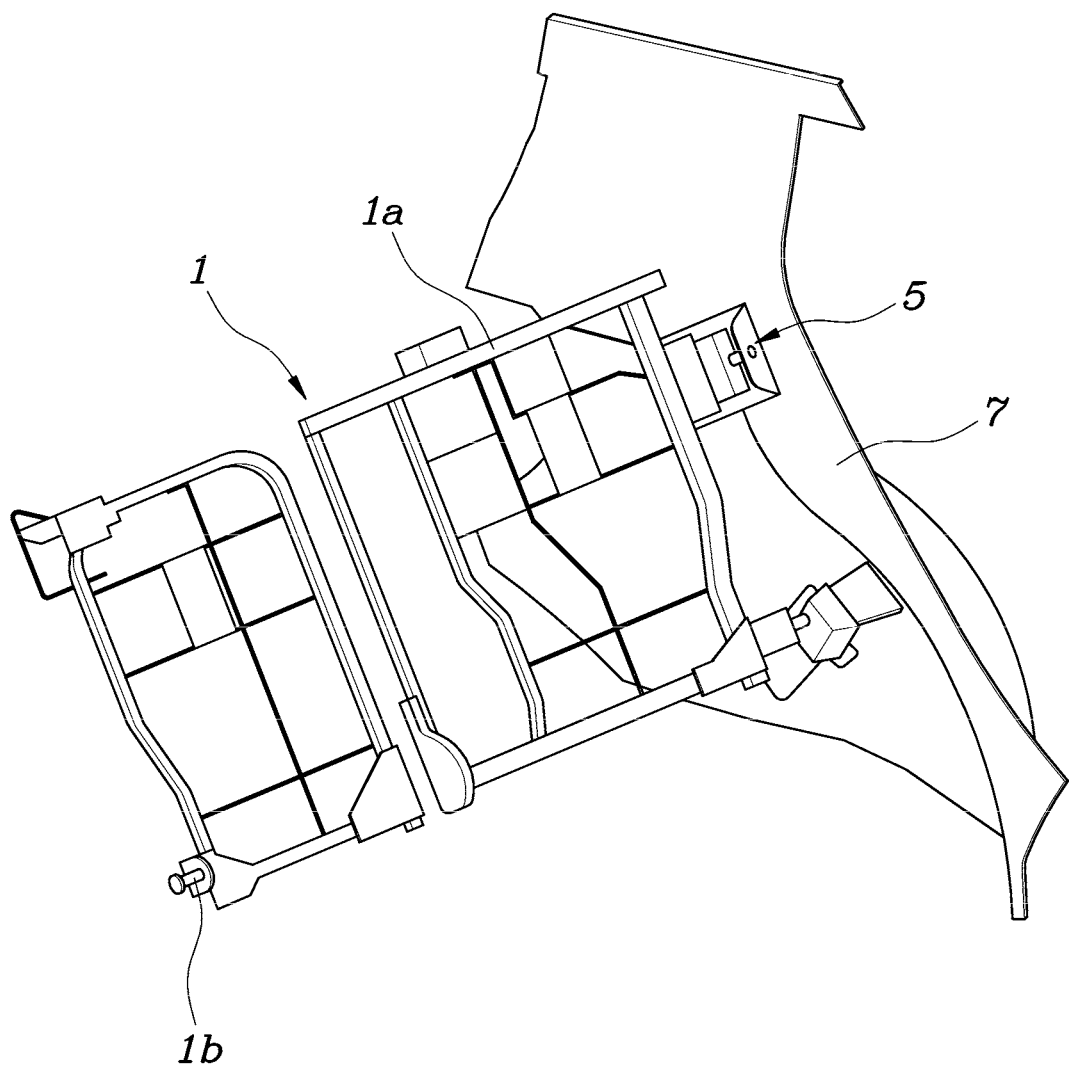
FIG. 1 is a diagram exemplifying an installation position of a reclining device according to the present disclosure.
Figure 2:
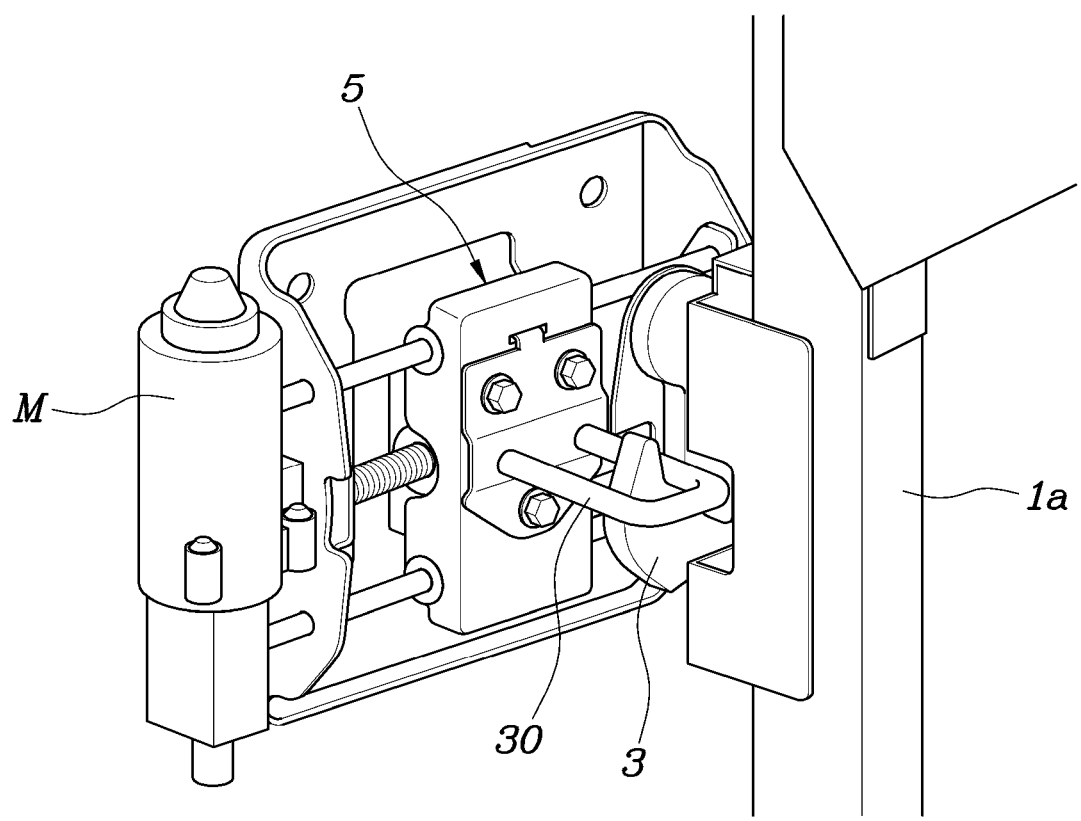
FIG. 2 is a diagram illustrating a state where a striker is combined with a latch according to the present disclosure.

FIG. 1 is a diagram exemplifying an installation position of a reclining device according to the present disclosure, and FIG. 2 is a diagram illustrating a state where a striker 30 is combined with a latch 3 according to the present disclosure.

Referring to the drawings, the present disclosure can be applied to a seatback 1 of a rear seat. A latch 3 combined with a side of a seatback frame 1a is rotated together with the seatback 1, and a striker 30 is provided on a rotation trajectory of the rotating latch 3. The striker 30 is installed inside a quarter panel of a vehicle body 7, and the latch 3 is combined with the striker 30.

For reference, the seat has a structure in which the seatback 1 is foldable based on a hinge shaft at a lower end of the seatback 1, and in folding and unfolding processes of the seatback 1, the latch 3 can be engaged with the striker 30.

In particular, according to the present disclosure, the striker 30 moves and is able to rotate the seatback 1 together with the latch 3, and the reclining device according to the present disclosure is configured to briefly include the latch 3 and a striker module 5.

Figure 3:
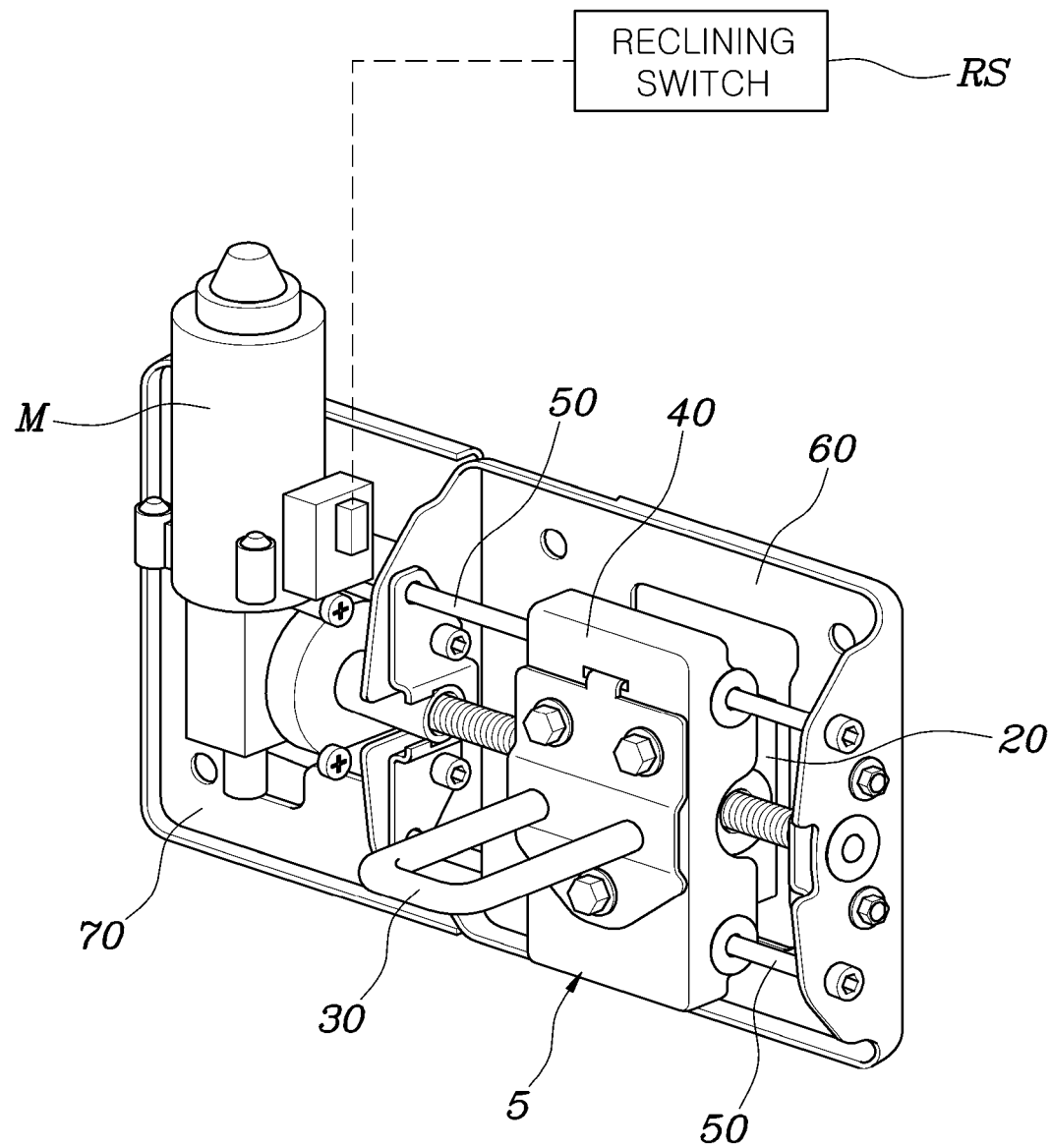
FIG. 3 is a diagram showing the structure and shape of a reclining device according to the present disclosure.

Referring to FIG. 3, the reclining device is configured to include the latch 3 installed on the side of the seatback 1 and being rotated together with the seatback 1, and the striker module 5 in which the latch 3 is engaged with the striker 30 installed in the vehicle body 7, and the striker 30 moves to draw a trajectory in a certain section overlapping the rotation trajectory of the latch 3 in a state where the latch 3 is engaged and reclines the seatback 1 together with the latch 3.

For example, the striker 30 is installed in a portion requiring fixing of an angle of the seatback 1 in the rotation trajectory of the latch 3, and the latch 3 is engaged with the striker 30 in the process in which the latch 3 is rotated together with the seatback 1.

Further, since the striker module 5 including the striker 30 moves in a straight line in a rotation trajectory section in which a reclining operation of the seatback 1 is required, the latch 3 combined with the striker 30 moves together with the striker 30, and thus the seatback 1 is reclined.

Figure 4:
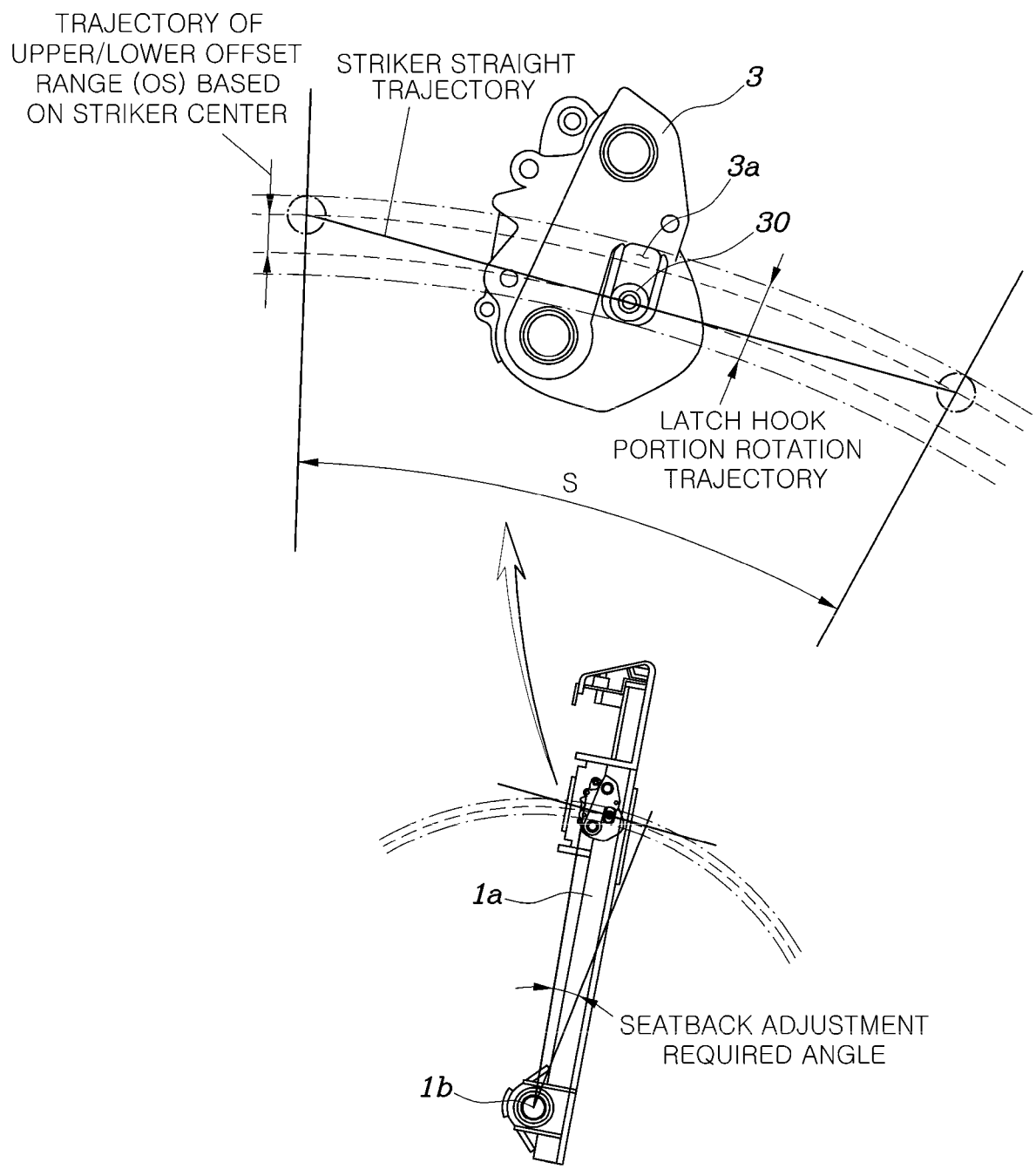
FIG. 4 is a diagram showing a section in which a rotation trajectory of a latch and a movement trajectory of a striker module overlap each other according to the present disclosure.

This will be described in detail through FIG. 4. A hook portion 3a, in which the striker 30 is combined with the latch 3, is formed, and the hook portion 3a is formed in the shape of an elongated hole along a normal direction with respect to the rotation trajectory of the latch 3.

Accordingly, when the striker 30 moves, the maximum angle range of the seatback may be determined by configuring an offset range OS in which the striker 30 is movable along the hook portion 3a in a state where the movement trajectory of the striker 30 and the rotation trajectory of the latch 3 are simultaneously satisfied.

In this case, the offset range OS may be a distance in which the striker 30 is movable along a length direction of the hook portion 3a based on a center portion of the striker 30, and the offset range OS may differ depending on designed values of the length of the hook portion 3a and the distance in which the striker 30 can move in a straight line.

That is, the distance between a hinge shaft 1b at the lower end of the seatback 1 and the latch 3 is relatively long, and in case of zooming in the rotation trajectory of the latch 3, although the latch 3 performs a rotation motion, the latch 3 appears to be rotated close to a linear motion, and the hook portion 3a of the latch 3 being combined with the striker 30 is formed long in the shape of an elongated hole along the normal direction with respect to the rotation trajectory of the latch 3.

Accordingly, if the striker 30 moves in a section S in which the linear motion trajectory of the striker 30 and the rotation motion trajectory of the latch 3 are simultaneously satisfied, the striker 30 is guided to move upward or downward within the offset range OS of the hook portion 3a, and thus the latch 3 combined with the striker 30 moves together.

Accordingly, since the latch 3 is pulled and moves together in the movement direction of the striker 30, the seatback 1 combined with the latch 3 moves together, and thus the seatback 1 can be steplessly reclined within the maximum reclining angle of the seatback 1 at which the linear motion trajectory of the striker 30 and the rotation motion trajectory of the latch 3 overlap each other.

Figure 5:
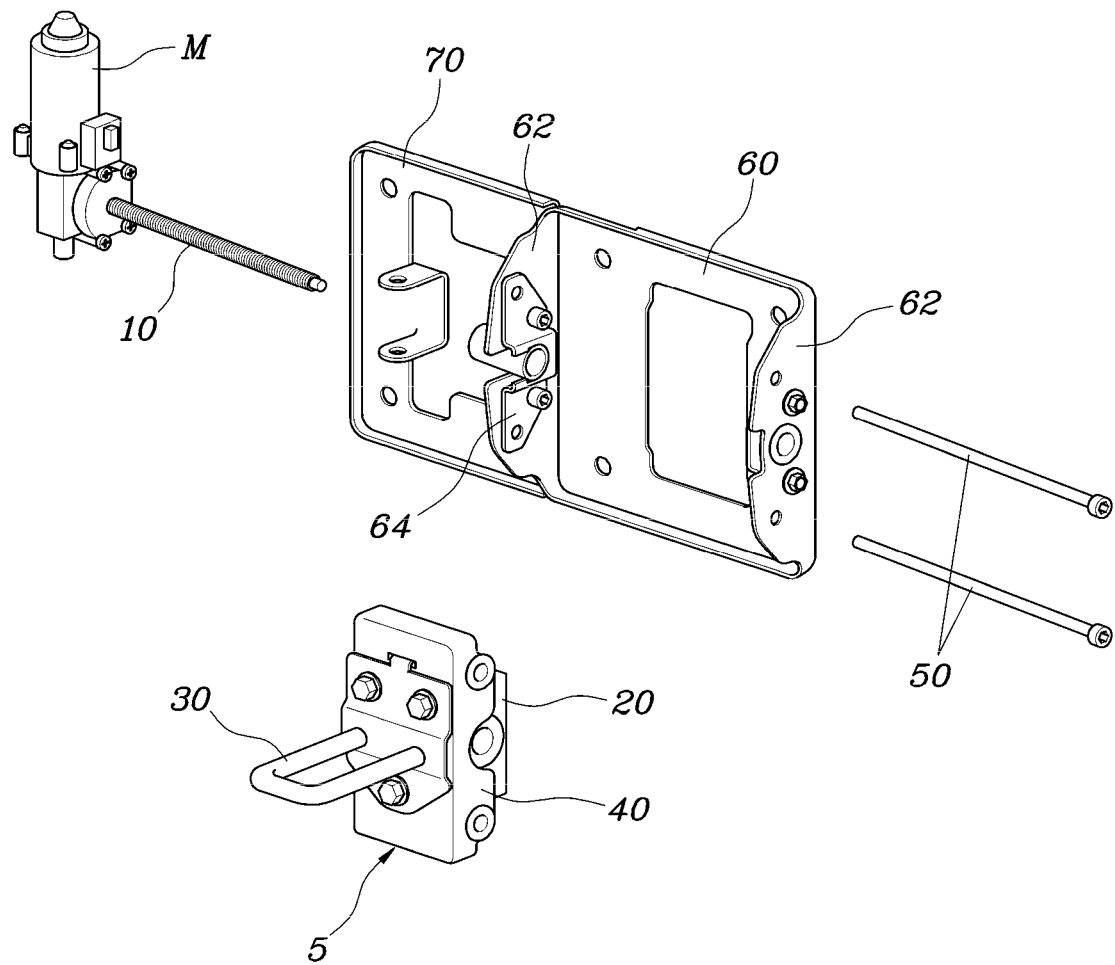
FIG. 5 is an exploded perspective view of main parts constituting a reclining device according to the present disclosure.
Figure 6:
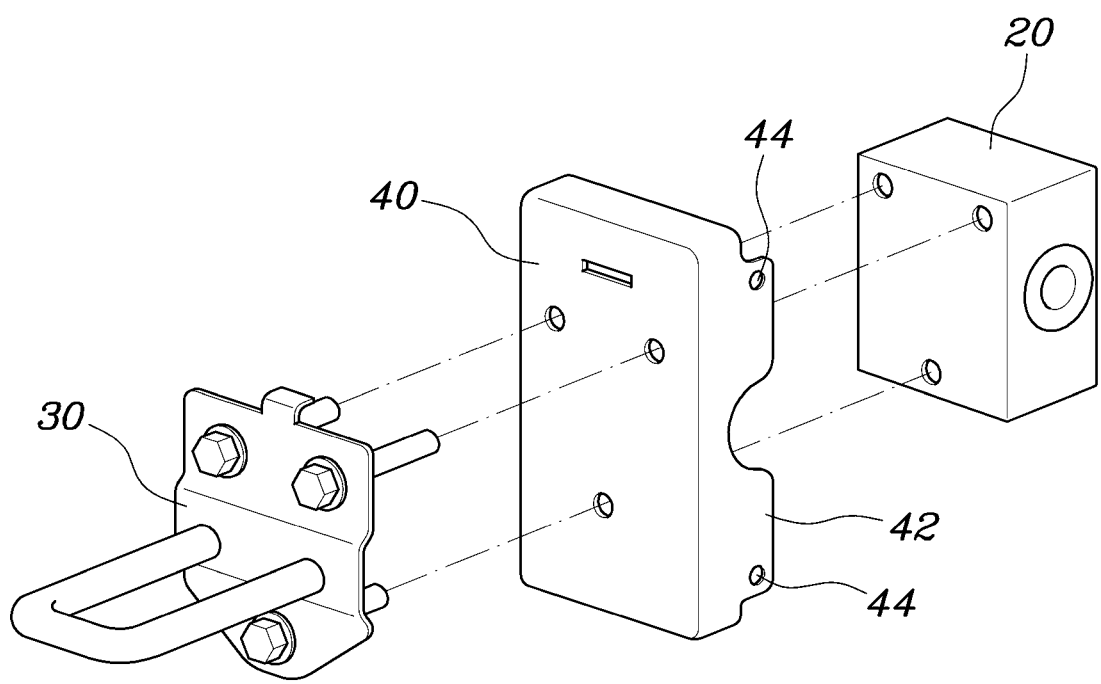
FIG. 6 is an exploded perspective view of a striker module according to the present disclosure.

Meanwhile, FIG. 5 is an exploded perspective view of main parts constituting a reclining device according to the present disclosure, and FIG. 6 is an exploded perspective view of a striker module 5 according to the present disclosure. The striker module 5 according to the present disclosure is configured to include a lead screw 10, a moving block 20, and the striker 30.

Referring to the drawing, the configuration of the striker module 5 will be described. The striker module 5 is configured to include a lead screw 10 installed on the vehicle body 7 along a linear trajectory on which the striker 30 moves, a moving block 20 penetratingly combined with the lead screw 10 in a screw structure and configured to move in a straight line along the lead screw 10 in a state where a rotation motion of the lead screw 10 is converted into a linear motion; and the striker 30 configured to move together with the moving block 20.

For example, the lead screw 10 is rotated in forward and reverse directions based on its axis, and inside the moving block 20, a hole having an inner periphery formed in a screw shape is formed to move in a straight line along the lead screw 10 when the lead screw 10 is rotated.

That is, in accordance with the rotation direction of the lead screw 10, the moving block 20 moves in a straight line toward one end or the other end of the lead screw 10, and thus the striker 30 combined with the moving block 20 moves together.

In addition, the reclining device according to the present disclosure is configured to include a guide bracket 40 combined between the moving block 20 and the striker 30, and a guide wire 50 combined with the vehicle body 7, penetratingly provided in the guide bracket 40 in a direction parallel to the lead screw 10, and configured to guide the straight movement of the moving block 20.

For example, bolting-engagement is performed in a state where the striker 30 is in surface contact with the front side of the guide bracket 40 and the moving block 20 is in surface contact with the rear side of the guide bracket 40.

Further, since the guide wire 50 penetrates the guide bracket 40 and is combined with a module mounting bracket 60 combined with the vehicle body 7, the striker module 5 may not be rotated, but may move in a straight line when the lead screw 10 is rotated.

In addition, an extension part 42 is formed at both ends of the guide bracket 40 in a direction orthogonal to the lead screw 10, and a guide hole 44 is formed on the extension part 42 and the guide wire 50 may be penetratingly provided therein.

That is, since the upper end and the lower end of the guide bracket 40 are formed to extend upward and downward, it is possible to secure an area in which the guide wire 50 is penetratingly provided.

Meanwhile, the reclining device according to the present disclosure may further include a motor M configured to provide a rotational driving force to the lead screw 10.

For example, the end part of the lead screw 10 may be combined with the shaft of the motor M, and the lead screw 10 may be rotated in accordance with the rotation of the motor M.

In addition, a reclining switch RS may be provided in a vehicle compartment, and the motor M may be rotated in a forward or reverse direction in accordance with an operation of the reclining switch RS.

For example, the reclining switch RS may be mounted on a vehicle door portion or a side trim, and a passenger may operate the reclining switch RS to lay down or set up the angle of the seatback 1.

That is, since the striker module 5 moves by the driving force of the motor M, it is possible to adjust the angle of the seatback 1 only by the operation of the reclining switch RS.

Accordingly, more luxurious and comfortable usability is provided in adjusting the angle of the seatback 1, and the cost and the weight of the reclining device can be reduced through structure simplification as compared with the existing reclining mechanism.

Figure 7:
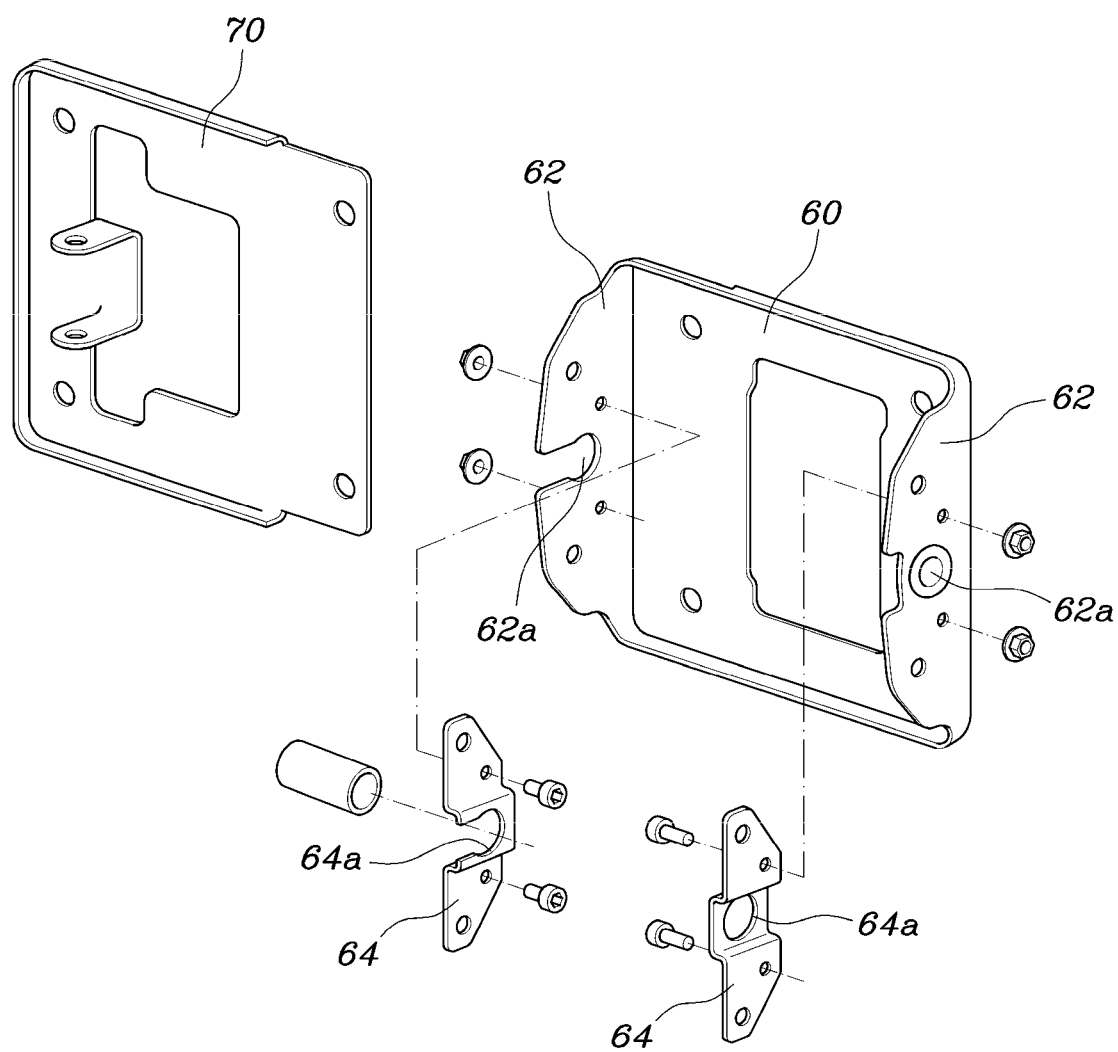
FIG. 7 is an exploded perspective view of a module mounting bracket and a motor mounting bracket according to the present disclosure.

Meanwhile, FIG. 7 is an exploded perspective view of a module mounting bracket 60 and a motor mounting bracket 70 according to the present disclosure.

Referring to the drawing, the module mounting bracket 60 is combined with the vehicle body 7, a support part 62 is formed to be bent at both ends of the module mounting bracket 60 toward the striker 30, a sub bracket 64 is combined with the support part 62, a main support hole 62a and a sub support hole 64a are coaxially formed on the support part 62 and the sub bracket 64, respectively, the main support hole 62a and the sub support hole 64a being formed to be spaced apart from each other, and the lead screw 10 may be inserted into and supported by the main support hole 62a and the sub support hole 64a.

For example, a middle portion of the module mounting bracket 60 being mounted on the vehicle body 7 is formed in the shape of a rectangular plate, and the support part 62 is formed to extend from the middle portion of the module mounting bracket 60 in a vertical direction.

Further, the upper end and the lower end of the sub bracket 64 are mounted inside the support part 62, and the main support hole 62a is formed at a middle end of the support part 62, and the sub support hole 64a is formed at a middle end of the sub bracket 64.

In this case, since the cross section of the middle end portion of the sub bracket 64 is formed in a "U" shape, a structure is provided, in which the main support hole 62a and the sub support hole 64a are formed to be spaced apart from each other.

Accordingly, since the lead screw 10 is inserted into and supported by the main support hole 62a and the sub support hole 64a, respectively, the number of support points of the lead screw 10 is increased, and thus the lead screw 10 can be supported more stably as well as the straightness of the lead screw 10 can be improved.

For reference, both ends of the guide wire 50 are also penetratingly mounted on the sub bracket 64 and the support part 62.

Continually, as shown in FIG. 7, according to the present disclosure, a bracket on which the striker module 5 and the motor M are mounted may be individually configured.

Referring to the drawing, a motor mounting bracket 70 is combined with the vehicle body 7 and the motor M is mounted thereon, an end part of the motor mounting bracket 70 and an end part of the module mounting bracket 60 are provided to overlap each other, and border portions and overlapping portions of the motor mounting bracket 70 and the module mounting bracket 60 may be bolting-combined with the vehicle body 7.

For example, not only the module mounting bracket 60 but also the motor mounting bracket 70 is formed in the shape of a rectangular plate, and the module mounting bracket 60 and the motor mounting bracket 70 are formed to have the same upper and lower lengths.

Further, in a state where a part of the motor mounting bracket 70 overlaps the rear side of the module mounting bracket 60, the above brackets are assembled to the vehicle body 7 through 6-point bolting.

That is, since the motor mounting bracket 70 and the module mounting bracket 60 are mounted on the vehicle body 7 in a state where they overlap each other, the combination stiffness of the mounting bracket is increased, and thus the combination stiffness of the motor M and the striker module 5 being mounted on the motor mounting bracket 70 and the module mounting bracket 60 can also be increased.

Figure 8A:
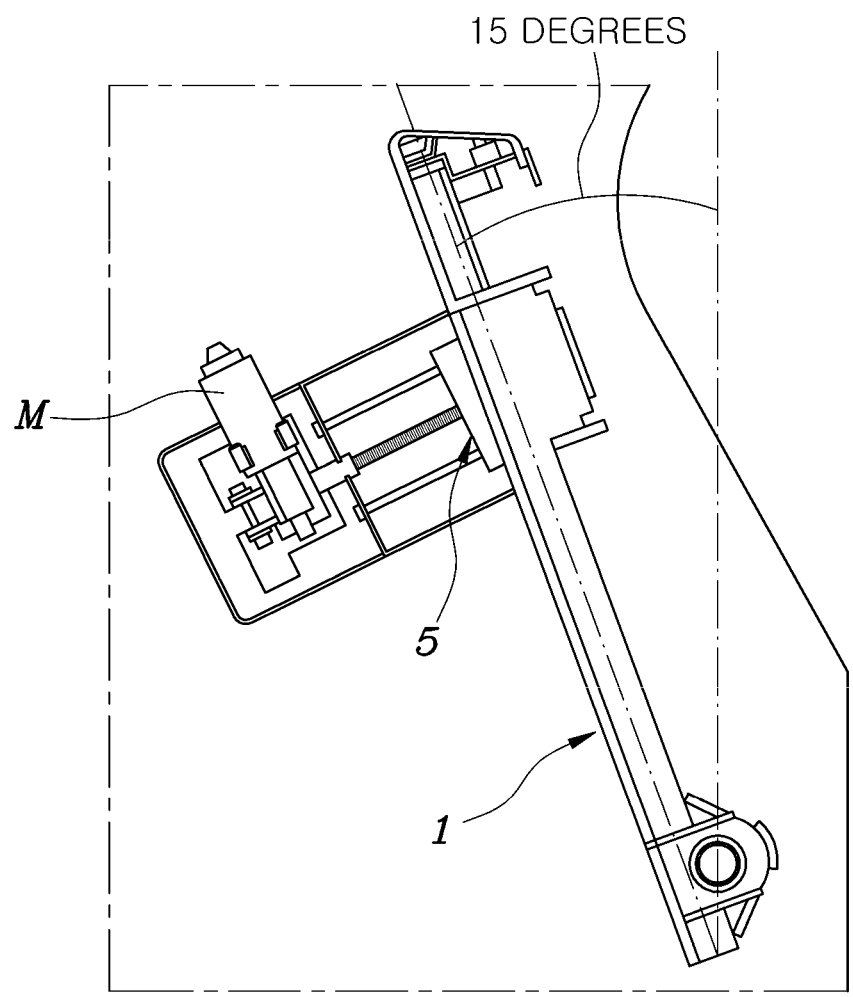
FIGS. 8A, 8B, and 8C are diagrams exemplifying an adjustment of a seatback angle in accordance with movement of a striker module according to the present disclosure.
Figure 8B:
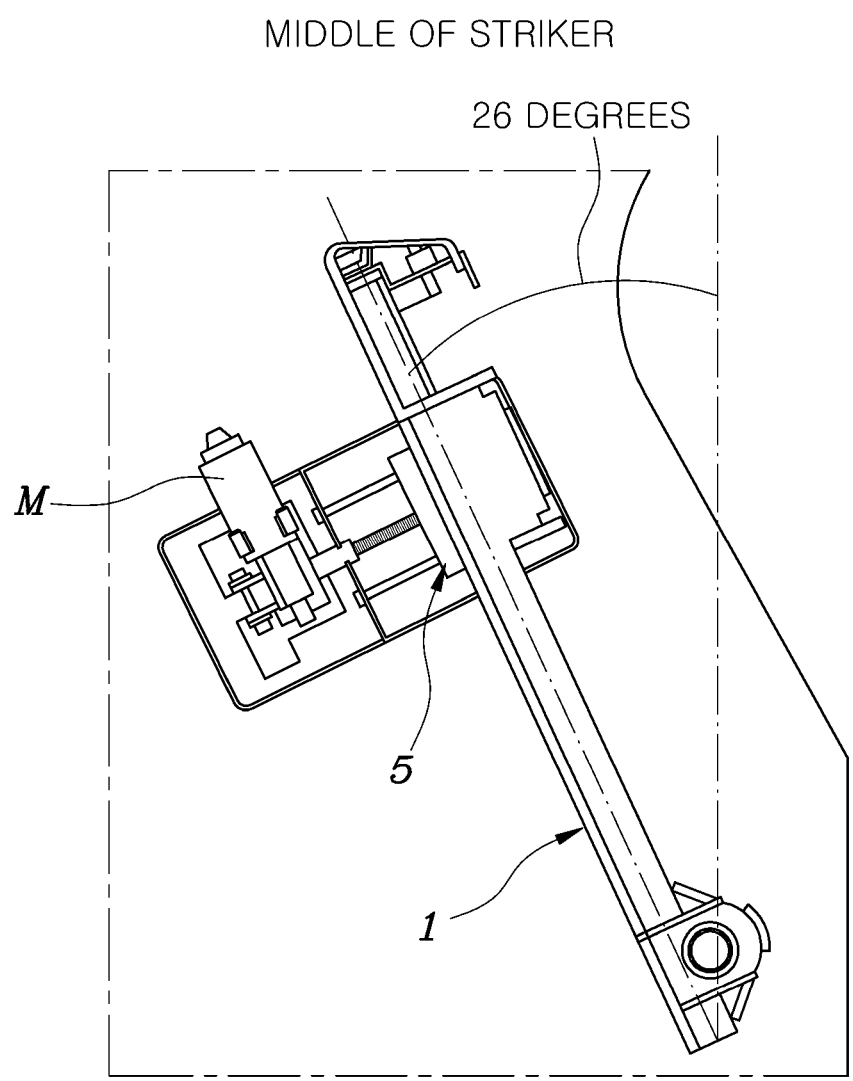
Figure 8C:
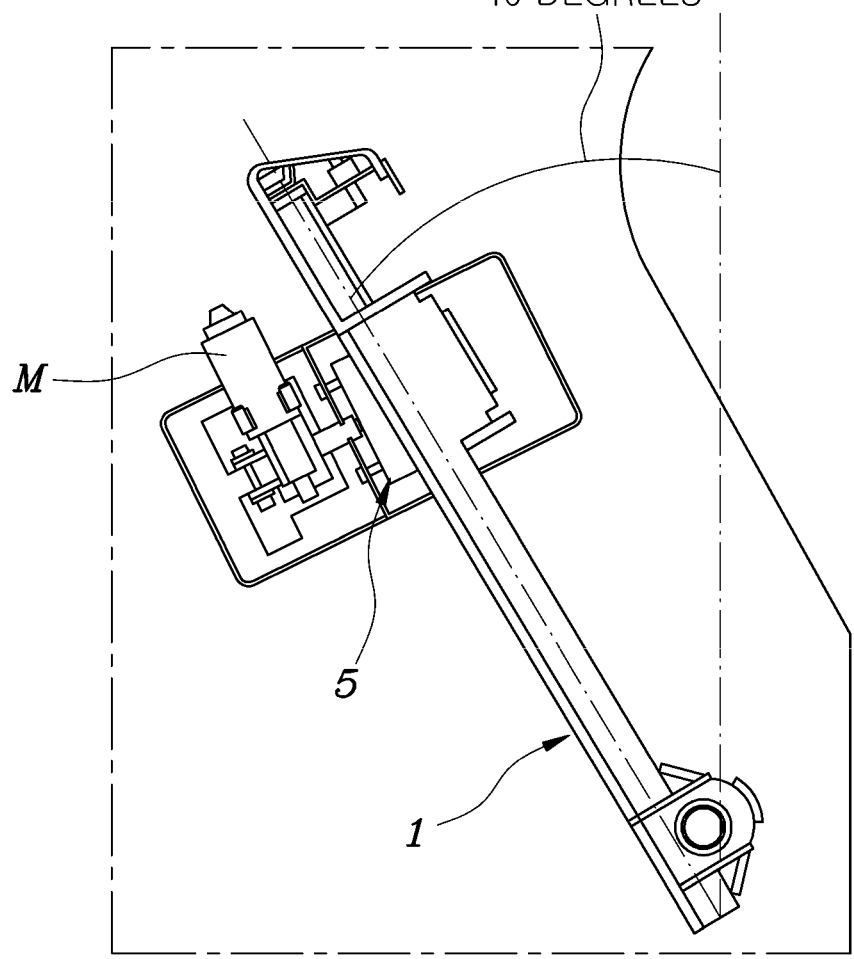

Meanwhile, FIGS. 8A to 8C are diagrams exemplifying an adjustment of an angle of a seatback 1 in accordance with movement of a striker module 5 according to the present disclosure.

For example, the maximum angle range of the seatback may be set to 10° to 50°.

Referring to the drawings, by moving the striker 30 back and forth of the lead screw 10 through the operation of the motor M, the latch 3 combined with the striker 30 moves together, and thus the angle of the seatback 1 can be adjusted.

That is, FIG. 8A shows a state where the striker 30 moves to the foremost position of the lead screw 10 through the operation of the motor M. In this state, the seatback 1 maximally sets up within the reclining operation range of the seatback 1, and in this case, the angle of the seatback 1 is at the level of 15°.

Further, FIG. 8B shows a state where the striker 30 moves to the middle position of the lead screw 10 through the operation of the motor M. In this state, the seatback 1 is positioned at a middle angle within the reclining operation range of the seatback 1, and in this case, the angle of the seatback 1 is at the level of 26°.

Further, FIG. 8C shows a state where the striker 30 moves to the rearmost position of the lead screw 10 through the operation of the motor M. In this state, the seatback 1 maximally lies down within the reclining operation range of the seatback 1, and in this case, the angle of the seatback 1 is at the level of 40°.

As described above, according to the present disclosure, since the striker 30 moves in accordance with the operation of the motor M and the latch 3 is pulled to move in the movement direction of the striker 30, the seatback 1 combined with the latch 3 moves together, and thus it is possible to recline the seatback 1 at stepless angles.

Although specific embodiments of the present disclosure have been illustrated and described for illustrative purposes, those of ordinary skill in the art will appreciate that various modifications, additions and substitutions are possible, without departing from the scope and spirit of the present disclosure as disclosed in the accompanying claims.

The invention claimed is:

1. A reclining device for a seat, comprising:
a latch installed on a side of a seatback; and
a striker module in which the latch is engaged with a striker installed in a vehicle body;
wherein the striker moves in a certain section overlapping a rotation trajectory of the latch in a state where the latch is engaged, and wherein the striker reclines the seatback together with the latch;
wherein the striker module comprises:
a lead screw installed on the vehicle body along a trajectory on which the striker moves;
a moving block penetrating the lead screw in a screw structure, the moving block being configured to move in a straight line along the lead screw in a state where a rotation motion of the lead screw is converted into a linear motion; and
wherein the striker is configured to move together with the moving block; and
wherein the reclining device further comprises a lead screw installed on the vehicle body along a trajectory on which the striker moves;
a moving block penetrating the lead screw in a screw structure, the moving block being configured to move in a straight line along the lead screw in a state where a rotation motion of the lead screw is converted into a linear motion; and
wherein the striker is configured to move together with the moving block.

2. The reclining device according to claim 1, wherein an extension part is formed at both ends of the guide bracket in a direction orthogonal to the lead screw; and
wherein a guide hole is formed on the extension part, and the guide wire penetrates the guide hole.

3. The reclining device according to claim 1, further comprising a motor configured to provide a rotational driving force to the lead screw.

4. The reclining device according to claim 3, wherein a reclining switch is provided in a vehicle compartment; and
wherein the motor is rotated in a forward or reverse direction upon operation of the reclining switch.

5. The reclining device according to claim 3, wherein a module mounting bracket is secured to the vehicle body;
a support part is bent at both ends of the module mounting bracket toward the striker;
a sub bracket is secured to the support part;
a main support hole and a sub support hole are coaxially formed on the support part and the sub bracket, respectively, the main support hole and the sub support hole being spaced apart from each other; and
the lead screw is inserted into and supported by the main support hole and the sub support hole.

6. The reclining device according to claim 5, wherein a motor mounting bracket is secured to the vehicle body and the motor is mounted thereon;
an end part of the motor mounting bracket and an end part of the module mounting bracket overlap each other; and
border portions and overlapping portions of the motor mounting bracket and the module mounting bracket are bolted to the vehicle body.

7. The reclining device according to claim 1, wherein a hook portion in which the striker is secured to the latch is formed;
the hook portion is formed in a shape of an elongated hole along a normal direction with respect to the rotation trajectory of the latch; and
a maximum angle range of the seatback is determined by configuring an offset range in which the striker is movable along the hook portion in a state where the movement trajectory of the striker and the rotation trajectory of the latch are simultaneously satisfied.

8. The reclining device according to claim 7, wherein the maximum angle range of the seatback is 10° to 50°.

* * * * *